Dec. 12, 1967  H. A. MACKIE  3,357,511
AIR CUSHION SUPPORTED, OMNIDIRECTIONALLY
STEERABLE, TRAVELING MAGNETIC FIELD
PROPULSION DEVICE

Filed Oct. 11, 1965

INVENTOR.
Harry A. Mackie
BY
W. F. Wagner
ATTORNEY

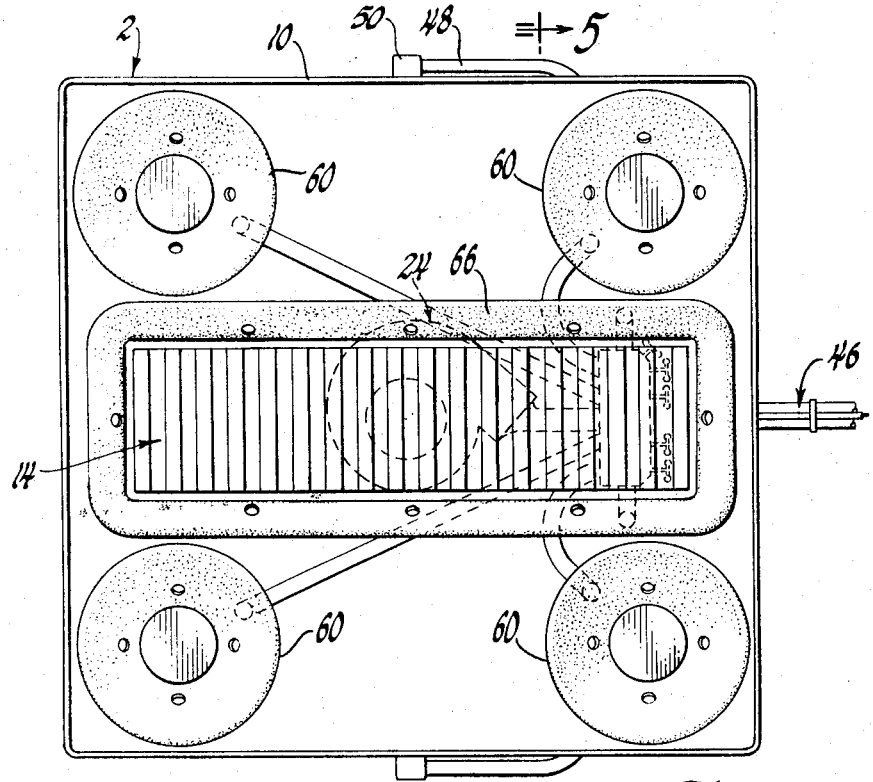
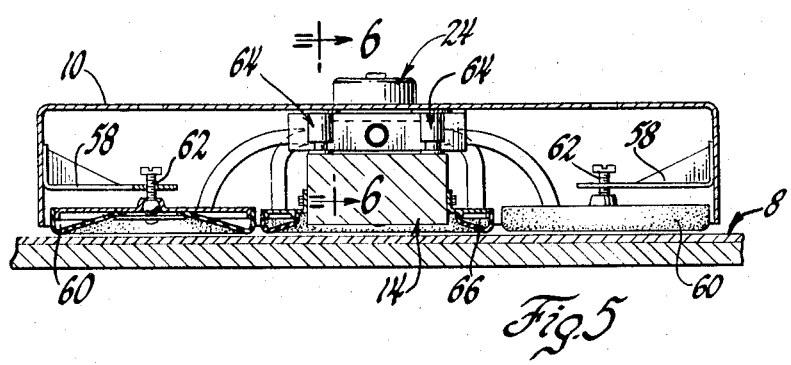
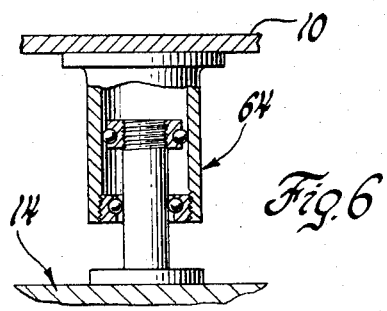

United States Patent Office 3,357,511
Patented Dec. 12, 1967

3,357,511
AIR CUSHION SUPPORTED, OMNIDIRECTIONALLY STEERABLE, TRAVELING MAGNETIC FIELD PROPULSION DEVICE
Harry A. Mackie, Birmingham, Mich., assignor to General Motors Corporation, Detroit, Mich., a corporation of Delaware
Filed Oct. 11, 1965, Ser. No. 494,755
10 Claims. (Cl. 180—7)

ABSTRACT OF THE DISCLOSURE

A linearly translating field producing means disposed in a hull structure supported in friction free relation with a bi-metallic floor is selectively angularly oriented by a steering member on the hull. When energized, the linearly translating field producing means exerts continuous thrust on the hull in a random path determined by the steering member.

This invention relates to omnidirectionally mobile air cushion supported ground proximate structures utilizing traveling magnetic field propulsion devices.

In the wide variety of industrial and commercial material handling applications, a need exists for lifting and propelling devices possessing omnidirectional mobility coupled with efficient propulsion. While powered wheel devices of various kinds have been and are currently available, in general they exhibit certain operating limitations in terms of optimum tractive effort and true omnidirectional mobility. Thus, for example, in the case of the "tug" type of device where the load is pushed or pulled rather than being supported on the device, the propelling effort is limited by loss of wheel traction. Similarly, where the load is carried on the wheeled device, some degree of turning radius is required which adversely affects maneuverability.

The present invention is concerned with an arrangement enabling omnidirectional orientation of the direction of thrust of a traveling magnetic field propulsion device which operates over a surface area formed of an upper non-ferrous layer and a lower ferrous layer. The linearly translating or traveling field producing means is mounted on a carrier or hull and is supported above the non-ferrous layer in gapped relation thereto by one or more air cushion devices which in addition to maintaining the necessary gap permit the carrier and hence the direction of linear translation of the field producing means to be steered omnidirectionally. As a result, the entire device is capable of producing directionally controlled continuous thrust in a random path over the entire area of the prepared surface. Further, since the thrust produced by the traveling magnetic field is not dependent upon physical contact with the surface, optimum thrust is achieved irrespective of whether the device actually supports the load to be propelled.

As used herein, the term "traveling magnetic field propulsion device" denotes the broad family of devices commonly referred to as "linear electric motors," the original disclosure of which is believed to be U.S. Reissue Patent No. 12,700, Zehden, entitled, "Electric Traction Device." In the indicated reference, it has been proposed to utilize the so-called linear electric motor to propel a train or similar vehicle along a controlled or guided path. Similarly, it has been more recently proposed to modify the Zehden construction to the extent of supporting the weight of the vehicle by air cushion means. In both cases, however, the linear motor arrangement involves laterally opposed field producing means which straddle an upright conducting rib or rail with the result that propulsion can be obtained only along the predetermined guide path. In contrast, the present invention affords complete directional freedom of movement over a surface of any selected area, as well as providing commensurate change in direction of thrust produced.

Additional objects, advantages and features of the invention will become more fully apparent as reference is had to the accompanying specification and drawings wherein:

FIGURE 4 is a bottom plan view of a further embodiment of the invention.

FIGURE 5 is a view looking in the direction of arrows 5—5 of FIGURE 4.

FIGURE 6 is an enlarged fragmentary view of a detailed construction shown in FIGURE 5.

Figure 1:
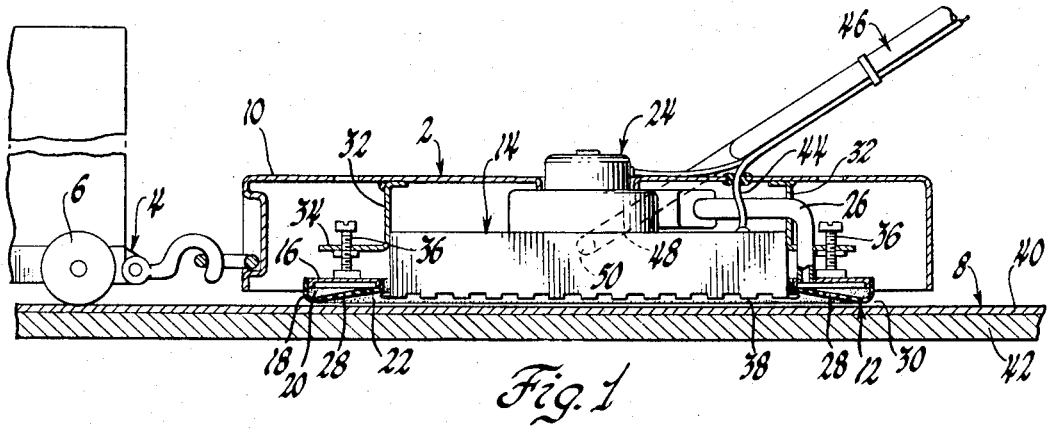
FIGURE 1 is a side elevational view, partly in section, of one embodiment of the invention.

Referring now to the drawings and particularly FIGURE 1, there is shown an omnidirectionally steerable propelling device 2 which is adapted for connection in operating relationship with a load supporting truck 4 having wheels 6 engaging a prepared floor 8. In accordance with the invention, device 2 includes a hull or carrier 10 which is supported in substantially friction-free relation with prepared surface 8 by means of a low unit loading air cushion device 12 mounted in surrounding relation with a traveling field producing means 14. Air cushion device 12 and corresponding units hereinafter referred to are preferably of the flexible plenum chamber type shown and described in co-assigned application Ser. No. 4,465, filed January 25, 1960, Mackie et al., entitled, "Air Cushion Vehicle," and now abandoned, wherein a rigid upper surface 16 is joined with a flexible lower annular membrane 18 to form an inflatable annular chamber 20 of inverted air foil cross section which surrounds a central plenum cavity 22 overlying the floor 8. In operation, when air is introduced from blower 24 through conduit 26, chamber 20 is caused to inflate and elevate surface 16 and the structure rigidly associated therewith to a predetermined level above the surface 8. Continuing flow of air into chamber 20 emerges through apertures 28 into plenum cavity 22 and establishes a superatmospheric cushion of air which functions to sustain the entire device in frictionless relation to the surface. After establishment of frictionless support, the required rate of flow of air into chamber 20 is determined by the rate of discharge of air from cavity 22 through the annular throttling gap or circular choke 30 formed between the surface 8 and the lowermost level of membrane 18. Inasmuch as the air pressure within chamber 20 and cavity 22 is greater than atmosphere, continual leakage occurs through choke 30. However, choke 30 is maintained automatically at a relatively shallow dimension on the order of 1 to 5 thousandths of an inch due to the fact that air passes therethrough at high velocity and hence low pressure, so that the higher pressure within chamber 20 urges the membrane into close proximity with the surface 8. Further, if the throttling gap is diminished by increasing a load on the device, the rate of lateral discharge of air is choked sufficiently to cause an increase in pressure which tends to restore the proper gap dimension, and conversely if the throttling gap is increased by diminished load, the rate of lateral air discharge increases and allows restoration of the proper gap dimension. Fluid producing means 14 is rigidly mounted in a fixed vertical position within hull 10 on a depending bracket 32. Bracket 32 includes a radially outwardly directed flange portion 34 on which the annular air cushion device 12 is vertically adjustably supported by threaded support assemblies 36, thus enabling the air cushion device to be adjusted vertically relative to the field producing means 14. As a result, when cushion device 12 is supplied with air from the electric motor driven blower 24 through conduit 26, the entire device 2 is elevated to a predetermined level above floor 8 to not only support it in frictionless relation thereto, but also establish a predetermined operating gap 38 between field producing means 14 and the surface 8.

In order to render the field producing means 14 effective to provide propulsive thrust for moving the load supporting structure 4 in a random path over the prepared surface 8, in accordance with the present invention the latter is fabricated in the form of a laminated upper layer 40 of non-ferrous conductive material such as copper or aluminum and a lower ferrous layer 42. Both layers 40 and 42 extend continuously over an indeterminate area such as the floor surface of a warehouse or similar installation. With the floor constructed in the manner indicated when the field producing means 14 is energized by an external source of power via transmission cable 44, the traveling magnetic field thus produced induces a mutual reaction between field producing means 14 and the prepared surface 8 developing thrust force tending to move device 2 in a linear path parallel with the major axis of the field producing means. Since the device is supported in frictionless relation with the surface by the air cushion means 12, all propulsive thrust produced is expended exclusively in propelling load supporting structure 4.

In accordance with another feature of the invention, the device 2 is provided with a manual control handle 46 having a forked lower end 48 hinged thereto on a horizontal axis 50 transverse to the major axis of field producing means 14. At its upper end, not shown, handle 46 is provided with conventional grips enabling the operator to manipulate the structure both for connection with a load to be moved as well as to exercise continuous and instantaneous directional orientation of the device so that the direction of propulsive thrust produced may be changed at will while the device is in operation. Thus, by exerting manual lateral effort on the upper end of handle 46, the device 2 is caused to continuously change angular horizontal orientation with an accompanying commensurate change in the direction of thrust produced by the means 14. It will be understood that the traveling magnetic field produced by the device shown is susceptible to reversal of direction by conventional switching means so that device 2 may be used to either push or pull a load to be moved.

Figure 2:
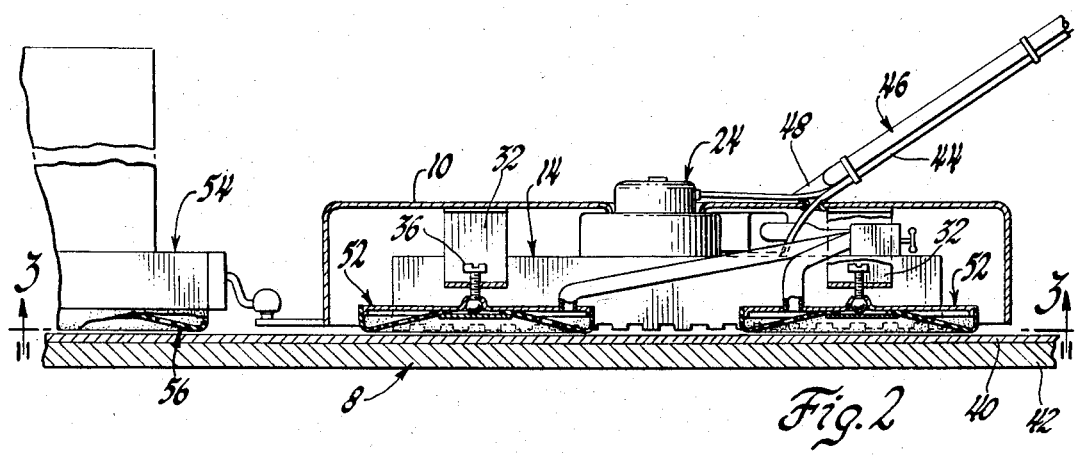
FIGURE 2 is a side elevational view, partly in section, of a second embodiment of the invention.
Figure 3:
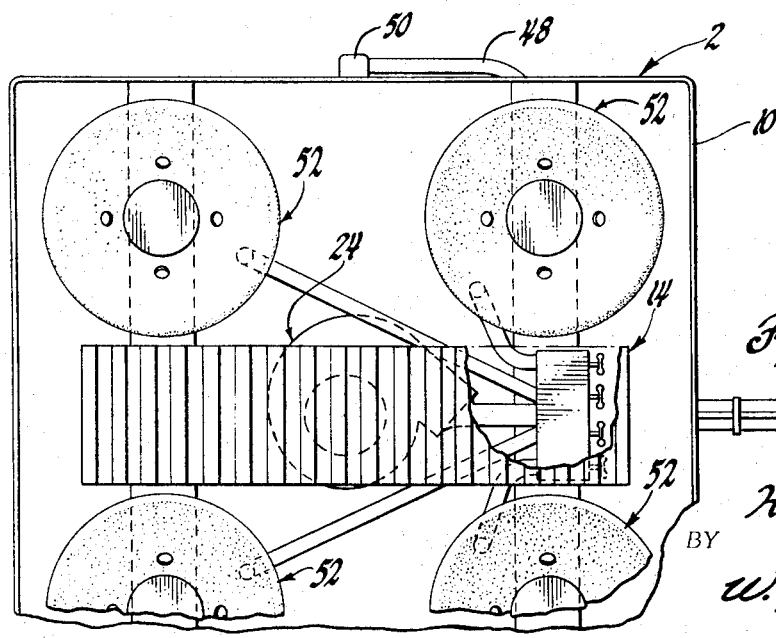
FIGURE 3 is a partially fragmentary bottom plan view of the structure shown in FIGURE 2.

In FIGURE 2, there is shown a modification of the invention wherein the single annular air cushion device is replaced by a plurality of individual circular air cushion devices 52 which are symmetrically oriented relative to the field producing means 14. Devices 52 are adjustably supported relative to the hull 10 in essentially the same manner as device 12 except for the addition of a ball and socket connection which enables each of the individual cushion devices to align itself in parallelism with the prepared floor 8.

To further enchance the effectiveness of a tug or propelling device of the type described, as further shown in FIGRUE 2, it may be connected to a load supporting structure 54 which in turn is itself supported relative to the floor surface by air cushion means 56 similar in form and operation to structures 12 and 52.

In FIGURES 5 and 6 there is shown a further embodiment of the invention which is so constructed as to enable the device to be used either solely as a tug or propelling device or to serve as both the load supporting device as well as the propelling means. To this end, the hull 10 is provided with brackets 58 to which individual symmetrically oriented air cushion devices 60 are connected by vertically adjustable threaded support assemblies 62. However, because of variations in the vertical level of hull 10 resulting from variation in loads imposed thereon, the traveling field producing means 14 is in turn supported on the hull 10 in a manner permitting rectilinear vertical movement therebetween. As seen best in FIGURE 6, this is accomplished by connecting the field producing means 14 to hull 10 by vertically telescoping slide bearing assemblies 64 which enable the field producing means to maintain a constant vertical position irrespective of transient variations in elevation of hull 10. The field producing means 14 is then in turn provided with a separate annular air cushion device 66 which serves solely to maintain the necessary gapped relation with surface 8.

While several embodiments of the invention have been shown and described, it will be apparent that other changes and modifications may be made therein. It is, therefore, to be understood that it is not intended to limit the invention to the embodiments shown, but only by the scope of the claims which follow.

I claim:

1. A tractionless friction free propulsion arrangement comprising in combination, a floor structure formed of an uninterrupted non-ferrous upper layer and an uninterrupted ferrous lower layer, a hull structure overlying said floor, omnidirectionally free bearing means supporting said hull in substantially frictionless relation with said floor, a linearly translating field producing means supported on said hull in gapped relation to the upper surface of said upper layer, and steering means on said hull for controlling horizontal angular orientation of said field producing means, whereby the direction of thrust acting on said hull is infinitely omnidirectionally variable thereby enabling optimum maneuverability of said hull within the confines of the entire area of said floor structure.

2. The invention in claim 1 wherein said steering means includes a manually engageable handle pivotally mounted on said hull on a horizontal axis transverse to the major axis of said field producing means.

3. The invention in claim 1 wherein said bearing means comprises at least one low unit loading air cushion device.

4. The invention in claim 1 wherein said bearing means comprises flexible choke air cushion means.

5. The invention in claim 1 including means for adjusting the vertical position of said bearing means relative to said hull.

6. The invention in claim 1 wherein said field producing means is supported on said hull in fixed vertical relation thereto.

7. The invention in claim 1 wherein said field producing means is supported on said hull in vertically movable relation thereto.

8. The invention in claim 7 wherein said field producing means is supported in said gapped relation by omnidirectionally free bearing means independent of said first mentioned bearing means.

9. The invention in claim 8 wherein said last mentioned bearing means comprises low unit loading air cushion means.

10. The invention in claim 9 wherein said air cushion means surrounds said field producing means.

References Cited

UNITED STATES PATENTS

| | | | |
|---|---|---|---|
| 782,312 | 2/1905 | Zehden | 310—13 |
| 1,982,391 | 11/1934 | Markey | 180—2 |
| 2,832,427 | 4/1958 | Shotwell | 180—2 |
| 2,973,822 | 3/1961 | Merry | 180—9.22 X |
| 3,209,849 | 10/1965 | Gondert et al. | 180—7 |
| 3,225,228 | 12/1965 | Roshala | 104—148 |
| 3,261,177 | 7/1966 | Amann et al. | 180—7 |
| 3,273,727 | 9/1966 | Rogers et al. | 214—16 |
| 3,276,530 | 10/1966 | Bornemann | 180—7 |
| 3,282,359 | 11/1966 | Satterfield | 180—7 |

FOREIGN PATENTS

| | | |
|---|---|---|
| 924,834 | 5/1963 | Great Britain. |
| 979,985 | 1/1965 | Great Britain. |
| 340,110 | 5/1936 | Italy. |

LEO FRIAGLIA, *Primary Examiner.*